Sept. 12, 1967  B. E. PATON ETAL  3,341,684
RESISTANCE BUTT WELDING MACHINE
Filed April 17, 1964  2 Sheets-Sheet 1

Sept. 12, 1967     B. E. PATON ETAL     3,341,684
RESISTANCE BUTT WELDING MACHINE Filed April 17, 1964     2 Sheets-Sheet 2

United States Patent Office 3,341,684
Patented Sept. 12, 1967

3,341,684
RESISTANCE BUTT WELDING MACHINE
Boris Evgenjevich Paton, Vasily Alexeevich Sakharnov, Vladimir Konstantinovich Lebedev, Sergey Ivanovich Kuchuk-Jatsenko, and Boris Afanasjevich Galjan, Kiev, U.S.S.R., assignors to Institute Elektrosvarki im. E.O. Patona., Kiev, U.S.S.R.
Filed Apr. 17, 1964, Ser. No. 360,555
4 Claims. (Cl. 219—101)

ABSTRACT OF THE DISCLOSURE

A resistance butt welding machine utilizing current carrying clamping jaws and having fixed and movable columns which are adjustable in at least two directions wherein a hydraulic press is accommodated in the fixed column and is adapted to clamp one part of the workpiece and wherein another hydraulic press is accommodated in the movable column and is adapted to fix another part of the workpiece, the movable column being capable of displacement relative to the fixed column via a plurality of column connecting rods which are coplanar with the workpiece to be welded.

---

Figure 3:
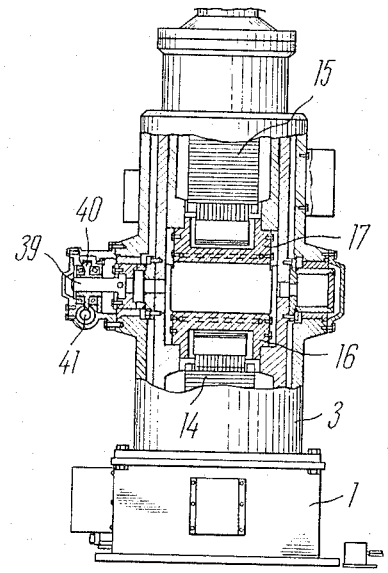

This invention relates to machines used for resistance-butt welding of rails, sectional steel and the like including workpieces with a large and compact cross-section.

The known similar welding machines comprise movable and fixed columns with hydraulic presses for clamping the workpieces, welding transformers, whose secondary winding is connected to the current-carrying clamping jaws and a drive serving to move the movable column relative to the fixed one.

Said welding machines have some disadvantages to which there should be referred heavy weight and bulky overall dimensions both conditioned by the necessity to provide sufficiently high rigidity of the machine housing with rather high upsetting forces actuated thereupon and resulting in bending of the basic elements of the machine housing.

It is another difficulty with said machines to obtain an accurate alignment of the workpieces to be welded as the particular operation has not been mechanized yet and, moreover, can not be performed after both parts of the welded workpiece are clamped.

Considerable sizes of the secondary winding in said machines stipulate a high value of short-circuiting resistance which increases electric energy losses and rated power for said welding machines.

An object of this invention is to remove said disadvantages.

As an aid to understanding this invention, it may be stated in essentially summary form that it concerns a resistance butt-welding machine comprising movable and fixed columns attached to the floor so as to extend therefrom with hydraulic presses for clamping the workpieces, welding transformers, the secondary winding of which is connected to the current-carrying clamping jaws and a drive to move said movable column relative to the fixed one, these units being connected together by various operative means as herein described so that they are capable of being operated in conjunction with one another. The resistance butt-welding machine is provided with two rods attached to said fixed column and symmetrically positioned with respect to and in the same plane with said column and two guides serving as guides of the movable column, the travel of which is obtained by two hydrocylinders. Hydrocylinder pistons are fitted onto said bars, whereas cylinder bodies are attached to the movable column. Mounted inside said columns, with side ports for the workpieces clamped in the hydraulic presses to pass through, are clamping hydraulic presses.

One of said hydraulic presses is accommodated in the movable column and has a drive providing its vertical travel inside said movable column, whereas the second hydraulic press is mounted in said fixed column and is provided with another drive providing its horizontal travel inside said fixed column. The hydraulic presses travel with the workpieces being clamped right in the course of their alignment. Two welding transformers are arranged in the hydraulic press of said stationary column both attached to the clamping jaws and being symmetrical relative to the welded workpiece, and one of said transformers is mounted into the body of the clamping hydraulic press piston.

Figure 1:
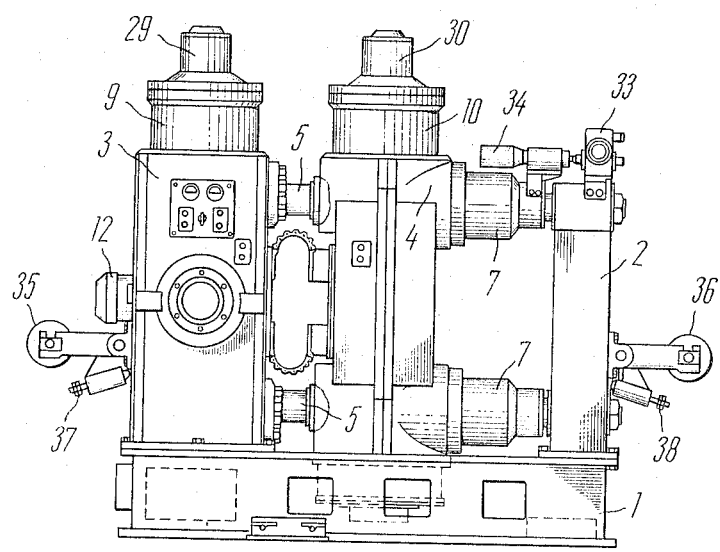
Figure 2:
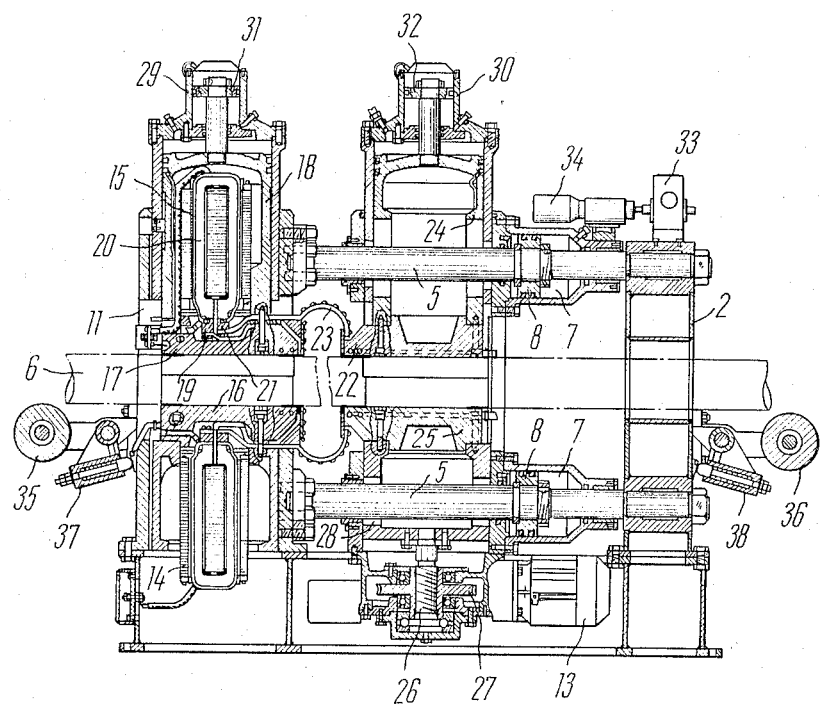

FIG. 1 is a general view of the suggested resistance butt-welding machine: FIG. 2 is a vertical cross-section view and FIG. 3 is a side view of the suggested resistance butt-welding machine with a partial section.

Referring to the drawings in its illustrative form, the resistance butt-welding machine comprises a pedestal or base 1. Mounted on the base are supports 2 and a fixed column 3. The movable column 4 is secured to two rods 5 mounted in the fixed column 3 and support 2. Rods 5 are symmetrically placed with respect to the welded workpiece 6 mounted in the same plane and serve as guides for the movable column 4 whose travel is obtained by means of hydrocylinders 7 whose pistons 8 are placed on rods 5, whereas hydrocylinder bodies are fastened to the movable column 4. The hydraulic presses 9 and 10, which serve for clamping the welded workpiece, are in fact columns with side hatch-doors 11 for the workpieces to be welded to pass through, said workpieces being clamped inside the hydraulic presses. The hydraulic press 9 is accommodated inside fixed column 3 and is provided with electric drive 12 serving for its horizontal travel inside said column. Hydraulic press 10 is mounted in the movable column 4 and provided with electric drive 13 serving for its vertical travel inside said column. The hydraulic presses 9 and 10 travel relative to the column and with the workpieces to be welded being clamped in them.

Two welding transformers 14 and 15 are housed in the hydraulic press 9 of the fixed column 3 being positioned right on clamping jaws 16 and 17 symmetrically relative to the workpiece 6 to be welded. The welding transformer 15 is mounted into the piston body of hydraulic press 9 for clamping the welded workpiece. Current is passed through transformer terminal 19 of secondary turn 20 connected to clamping jaw 17 whereas terminal 21 is connected to jaw 22 by means of a flexible conductor 23. Clamping jaw 22 is arranged on piston 24 of hydraulic press 10. Jaw 25 is fixed on the body of said hydraulic press. The body of the hydraulic press 10 with jaw 25 travels vertically to obtain vertical alignment of the workpiece which is done by means of screw 26 with a worm gear 27 connected to electric drive 13 by a wormshaft and functioning as the nut of said screw. The amount of travel depends upon the size of said hatch-doors 28.

Auxiliary cylinders 29 and 30 with pistons 31 and 32 serve to raise pistons 18 and 24 of hydraulic presses 9 and 10 as soon as the workpieces to be welded are released by the clamping jaws.

Slide valve 33 and electromechanical drive 34 constitute the hydraulic follow-up system of the movable column hydraulic cylinders 7. Guide rollers 35 and 36 provided with a spring arrangement 37 and 38 serve to facilitate workpiece feed into the welding machine. Screw 39 and worm pair 40 and 41 connected to the electrical drive 12 serve for horizontal travel of the hydraulic press 9 inside the fixed column with the workpiece 6 being clamped.

The mode of action of the resistance butt-welding machine in accordance with the invention as as follows:

The workpieces 6 to be welded are delivered to the clamping jaws 16 and 25 along rollers 35 and 36. Then the hydraulic presses 9 and 10 start actuating and their pistons 18 and 24 together with jaws 17 and 22 go down clamping the workpieces by the jaws. Horizontal and vertical alignment of the workpieces to be welded is obtained by means of drives 12 and 13 that move the hydraulic presses 9 and 10 with respect to the column.

Thereafter the electromechanical drive 34 is cut in which moves slide valve rod 33, due to which liquid is fed into hydrocylinders 7 which start bringing the welded workpieces together as usual in the welding process until they contact each other with their faces whereupon the current circuit is closed, and since now flashing of parts to be welded takes place, which provides their heating. If the parts are heated enough, the slide valve 33 opens and a great amount of liquid is allowed inside the hydrocylinders 7 and thus upsetting of workpieces takes place. The hydrocylinders 29 and 30 engaged, jaws 17 and 22 raise and thus the workpieces become released and are removed from the welding machine along rollers 35 and 36. This means the end of the welding cycle.

Application of rods 5, symmetrically arranged with respect to and in the same plane with the workpiece to be welded and also functioning as guides of the movable column, prevents any possible bending stresses adversely affecting the machine-bed during upsetting. Thus an opportunity is created to increase the rigidity of the welding machine housing with a decrease of its weight and overall dimensions.

Applictaion of clamping hydraulic presses inside said movable and fixed columns simplifies the design of the welding machine and provides convenient and reliable alignment of the workpieces after they are clamped by the clamping jaws of the welding machine.

Application of two welding transformers symmetrically positioned with respect to the workpiece, mounted inside said fixed column on the clamping jaws (one of them is mounted into the clamping hydraulic press piston) simplifies the design, reduces electric power consumption and contributes to stability of the welding process carried out by the method of continuous flashing.

What is claimed is:

1. A resistance butt-welding machine comprising a fixed column, a hydraulic press accommodated inside said column and adapted for clamping one part of a workpiece to be welded; a movable column, and a further hydraulic press accommodated inside said movable column and adapted for fixing another part of the workpiece to be welded; welding transformers mounted in said fixed column and including a secondary winding; current carrying clamping jaws connected to the secondary winding of said welding transformers and also connected to said hydraulic presses; two rods mounted inside the fixed column symmetrically arranged with respect to and in the same vertical plane with the workpiece to be welded and also serving as guides for the movable column; and two hydrocylinders including pistons positioned on said rods and mounted on the movable column.

2. A resistance butt-welding machine as claimed in claim 1 wherein the hydraulic presses of both the fixed and movable columns include wall-members with side hatch-doors for the workpieces to pass through; drive means to provide travel of said hydraulic press inside and vertical to the fixed column; further drive means to provide travel of the hydraulic press inside and parallel to the movable column, the hydraulic presses being adapted for travelling together with the parts of workpieces being clamped to effect alignment.

3. A resistance butt-welding machine as claimed in claim 1, wherein said welding transformers are mounted on said clamping jaws and are positioned symmetrically with respect to the workpiece and one of the transformers is mounted within the hydraulic press accommodated inside the stationary column.

4. A resistance butt-welding machine comprising a fixed column, a hydraulic press accommodated inside said column and adapted for clamping one part of a workpiece to be welded; a movable column and a further hydraulic press accommodated inside said movable column and adapted for fixing another part of the workpiece to be welded; welding transformers mounted in said fixed column and including a secondary winding; current-carrying clamping jaws connected to the secondary winding of said welding transformers and also connected to said hydraulic presses; two rods mounted inside the fixed column symmetrically arranged with respect to and in the same plane with the workpiece to be welded and also serving as guides for the movable column; two hydrocylinders including pistons positioned on said rods and mounted on the movable column, the hydraulic presses of both the fixed and movable columns including wall-members with side hatch-doors for the workpieces to pass through; drive means to provide travel of said hydraulic press inside and vertical to the fixed column; further drive means to provide travel of the hydraulic press inside and parallel to the movable column, the hydraulic presses being adapted for travelling together with the parts of workpieces being clamped to effect alignment.

References Cited

UNITED STATES PATENTS

| | | | |
|---|---|---|---|
| 2,302,420 | 11/1942 | Chapman | 219—101 |
| 2,805,318 | 9/1957 | Gladd et al. | 219—101 |
| 3,080,471 | 3/1963 | Rietsch | 219—101 |

RICHARD M. WOOD, *Primary Examiner.*

B. A. STEIN, *Assistant Examiner.*